Jan. 13, 1925.

E. GREEN 1,522,777

HACK SAW MACHINE

Filed April 20, 1923  3 Sheets-Sheet 1

INVENTOR
Everett Green,
BY
Arthur M. Hood.
ATTORNEY

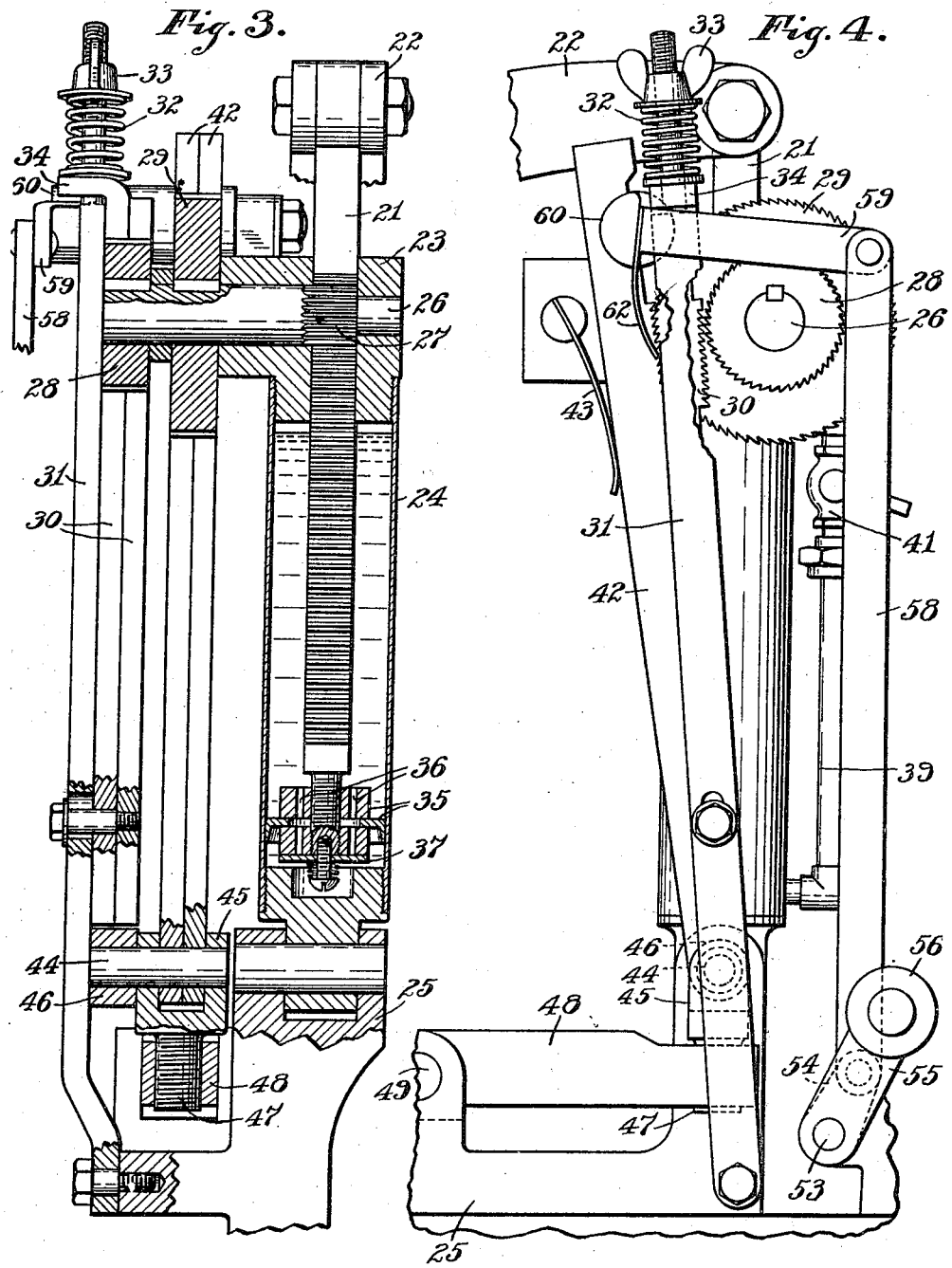

Jan. 13, 1925.
E. GREEN
HACK SAW MACHINE
Filed April 20, 1923 3 Sheets-Sheet 3
1,522,777
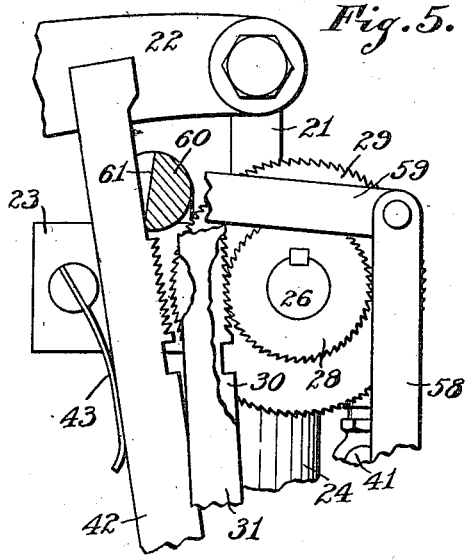
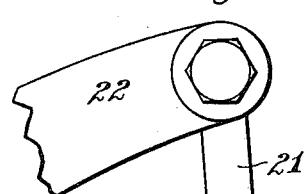
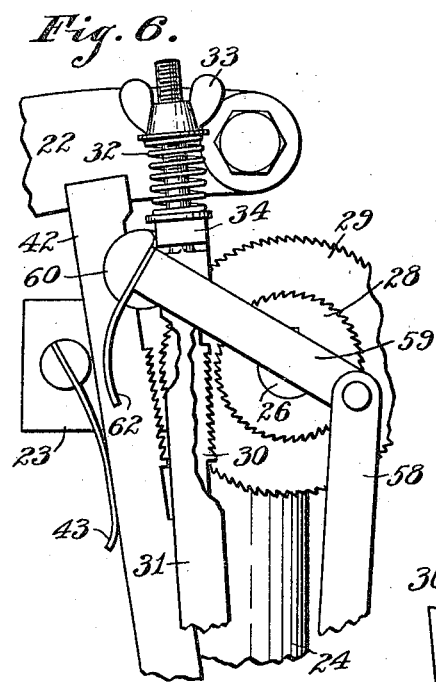
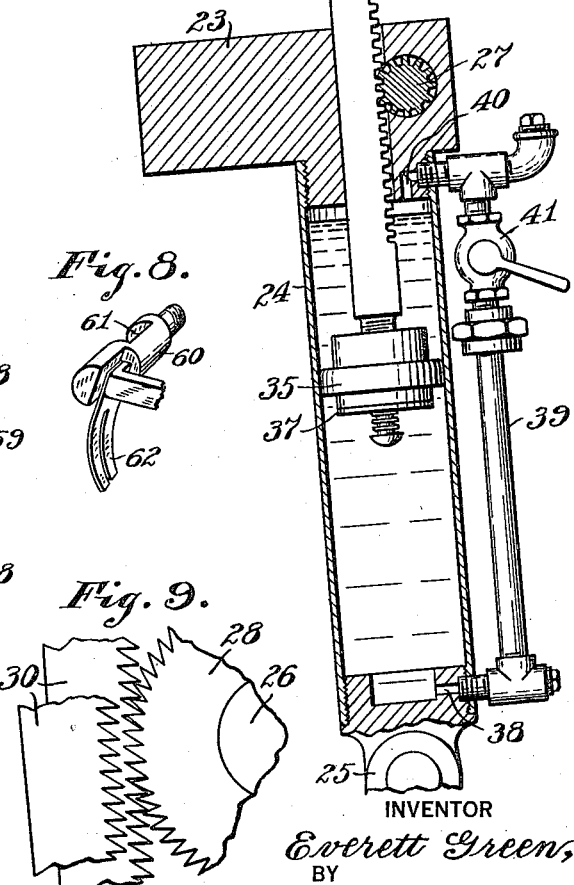
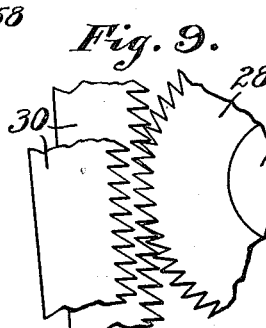
INVENTOR
Everett Green,
BY
Arthur M. Hood.
ATTORNEY Patented Jan. 13, 1925.

1,522,777

UNITED STATES PATENT OFFICE.

EVERETT GREEN, OF INDIANAPOLIS, INDIANA, ASSIGNOR TO E. C. ATKINS & COMPANY, OF INDIANAPOLIS, INDIANA, A CORPORATION OF INDIANA.

HACK-SAW MACHINE.

Application filed April 20, 1923. Serial No. 633,336.

*To all whom it may concern:*

Be it known that I, EVERETT GREEN, a citizen of the United States, residing at Indianapolis, in the county of Marion and State of Indiana, have invented a new and useful Hack-Saw Machine, of which the following is a specification.

My invention relates to improvements in hack saws and particularly to power operated saws of this type.

Certain of the objects of my invention are to improve the operating mechanism of the saw; to provide automatic means for feeding the saw to the material to be cut; to automatically throw the saw out of operation when the cut has been completed; to adjust the stroke of the saw to the size of the material to be cut and to provide means whereby the feed of the saw will be regulated in accordance with the cut of the saw.

For the purpose of disclosing my invention I have illustrated one embodiment thereof in the accompanying drawings in which—

Fig. 3 is an enlarged end elevation of the feed mechanism;

Fig. 4 is a side elevation thereof;

Fig. 5 is a detail of the saw feed showing the same in feeding position;

Fig. 6 is a similar view showing the same in throwout position;

Fig. 7 is a sectional view of the feed dashpot;

Fig. 8 is a perspective view of the throwout cam, and

Fig. 9 is a detail of the feed ratchet.

Figure 1:
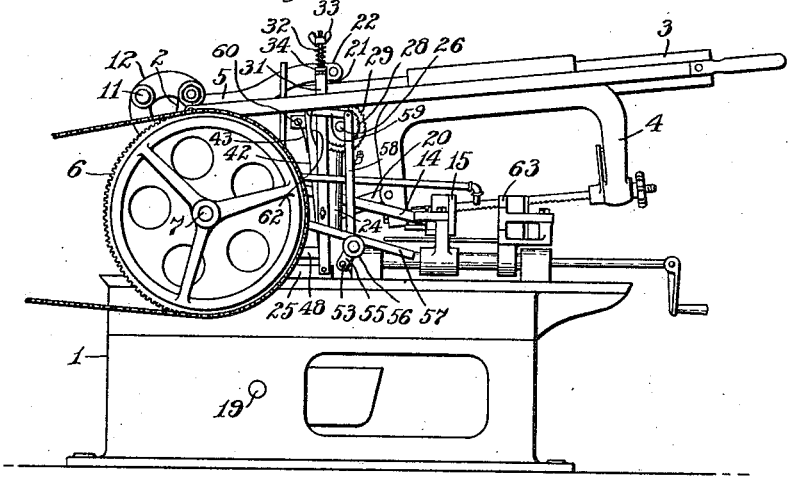
Fig. 1 is a side elevation of a saw embodying my invention.
Figure 2:
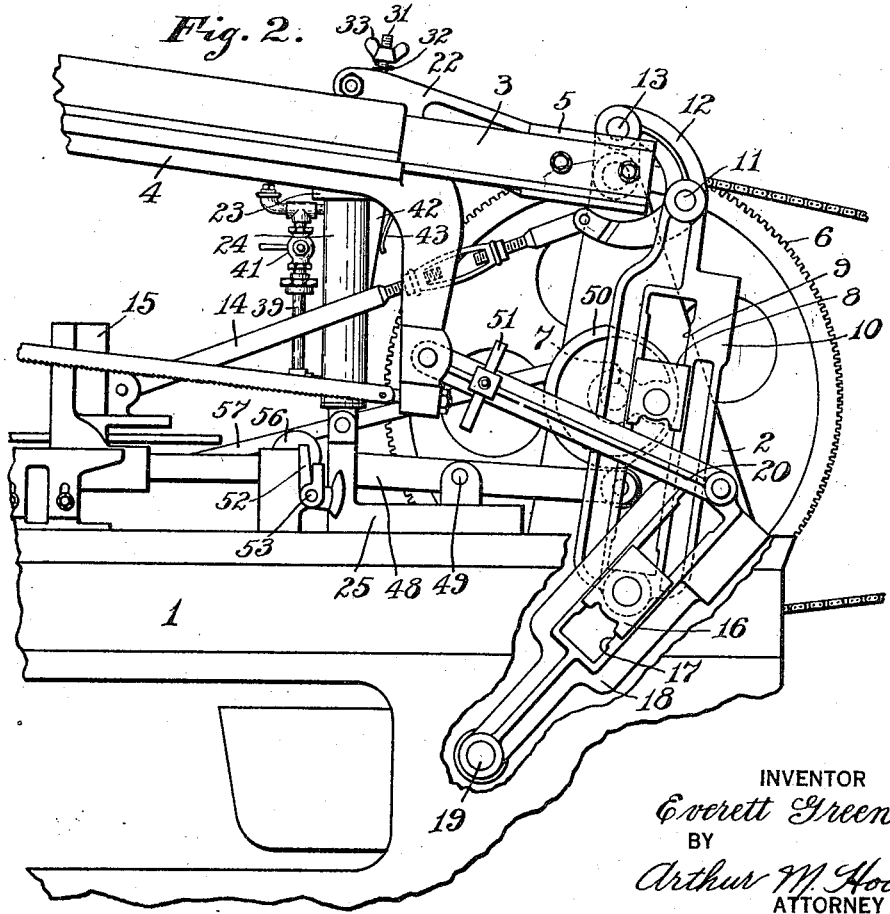
Fig. 2 is an enlarged elevation of the driving mechanism.

In the embodiment illustrated the base 1 is provided with an upright standard 2. The track 3 on which the saw frame 4 is slidably mounted is secured at one end to the pivot block 5 pivoted to the standard 2 while the opposite end of the track is free.

The saw is driven from a suitable drive wheel 6 loosely mounted on the shaft 7 and adapted to be drivingly connected thereto by a suitable clutch. This shaft 7 is provided with a crank pin having a slide block 8 sliding in the tracked groove 9 of the cross head 10. The cross head 10 is pivoted at 11 to a C link 12, one end of which is pivoted at 13 to the standard 2, while its opposite end is connected by an adjustable link 14 to the movable vise jaw 15. The outer end of the cross head 10 is provided with a slide block 16 operating in the tracked slot 17 of a cross head 18 which is pivoted at 19 to the side of the base 1 and has its opposite end connected by a link 20 with the saw frame 4. The link 12 being connected to the movable vise jaw 15, as the jaw is moved to accommodate the larger pieces of material, the pivoted point 11 will be raised thereby changing the fulcrum point of cross heads 10 and 18 and shortening the stroke of the saw and likewise when the jaw is moved to accommodate smaller pieces of material the pivot point 11 will be lowered, thereby increasing the length of the stroke of the saw.

In order to feed the saw to the work and disengage the same from the work on the non-cutting stroke, I provide a rack 21 connected at one end to an arm 22 on the block 5; this rack passes through the head 23 of a dash pot cylinder 24 pivotally mounted at its lower end in a bracket 25 on the base 1. A shaft 26 is mounted in the head 23 and has a gear 27 which meshes with the rack 21. This shaft is also provided at one end with a pair of ratchet wheels 28 and 29, the wheel 28 being of smaller diameter than the wheel 29. The ratchet 28 is adapted to be engaged by pawl teeth on reciprocating pawl bars 30 slidably mounted on a post 31 which extends upwardly from the bracket 25. The pawl bars 30 are urged downwardly by a coil spring 32 on the upper end of the post 31 and interposed between a wing nut 33 and a lip 34 on one of the pawl bars 30. The spring 32 urges the pawl bars 30 downwardly and they in turn have their teeth engage the ratchet wheel 28 to rotate the shaft 26 in a direction to move the rack 21 downwardly. This downward movement is retarded by a piston 35 on the end of the rack 21, which piston is provided with ports 36 closed on the downward stroke of the piston by a valve 37. The valve 37 however is so arranged that it has a slight vertical movement relative to the piston 35 so that it will automatically move away from the piston on the upward stroke of the piston and thereby open the ports 36. The dash pot cylinder 24 is adapted to be filled or partially filled with oil and as the piston 35 descends the oil is forced out of the opening 38 in the bottom of the dash pot and through a bypass pipe 39 to an opening 40 in the top of the dash pot cylinder. Arranged in the pipe 39 is a valve 41 which may be adjusted to control the rate of flow of the oil through the bypass and therefore the speed of descent of the piston 35.

The shaft is rotated in the opposite direction by the engagement with the ratchet wheel 29 of pawl bars 42, the teeth of which are urged into engagement with the ratchet wheel by a spring 43. The lower ends of the pawl bars 42 are pivotally mounted on a pivot pin 44 extending through the side walls of a block 45 and through the pawl bars 42. This pivot pin is provided at its outer end with a roller 46 arranged immediately beneath the bottoms of the pawl bars 30 to, as the pin is elevated, force the pawl bars upwardly against the tension of the spring 32. The block 45 is secured by a screw threaded shank 47 into one end of a lever 48 pivoted at 49 on the bracket 25 and having at its opposite end a roller adapted to engage a cam 50 mounted on and driven by the shaft 7 so that as the cam is rotated it will impart an oscillating movement to the lever 48 to thereby reciprocate the pawl bars 42 and impart a movement upwardly to the pawl bars 30, the pawl bars 30 being moved downwardly by the coil spring 32 as the pin 44 moves from beneath the same.

For disconnecting the driving wheel 6 from the shaft 7 and for throwing out of operative relation the feed pawl bars 30 and 42, I provide on the arm 20 an adjustable finger 51 which feeds downwardly with the saw and may be so adjusted as to engage, when the cut is complete and during the reciprocation of the link 20, the throw-out dog 52. This throw-out dog is mounted upon a shaft 53 which is rotated by the operation of the dog 52 to elevate a crank arm 54 and a crank arm 55. The crank arm 55 is provided with a roller 56 adapted to engage, when the arm is raised, beneath a clutch throw-out arm 57 for controlling the clutch connecting the drive wheel 6 with the driven shaft 7. The crank 54 is connected by a link 58 with an arm 59 secured to a rotatable shaft 60. This shaft is provided with a flattened surface 61 adapted to engage the upper end of the pawl bars 42 and carries the spring 62 which urges the pawl bars 30 into engagement with the ratchet wheel 28. As the shaft 53 is rotated to raise the crank 54, it in turn operates the arm 59 to rotate the shaft 60, thereby causing the flattened portion of this shaft to force the pawl bars 42 out of engagement with the ratchet wheel 29, and move the spring 62 out of pressure engagement with the pawl bars 30, permitting said pawl bars to move out of operative engagement with the ratchet wheel 28.

In operation the work is clamped between the stationary jaw 63 and movable jaw 15 of the vise on the frame 1, the movement of the jaw 15 to accommodate the work, adjusting the pivot point 11 to determine the length of stroke of the saw. The shaft 53 is rotated to raise the crank arms 54 and 55 which throws the feed mechanism into operative relation and connects the driving wheel 6 with the shaft 7. The saw is thus started in operation and after the completion of its first cutting stroke, the lever 48 is operated to raise the pawl bars 42, thereby rotating the shaft 26 and slightly raising the saw from the work to permit it to clear the work on its return stroke. At the same time, the pawl bars 30 are elevated, compressing the spring 32 and at the same time the piston 35 is raised in the dash pot 24. The saw is thus raised above the work so that on its return stroke it will not be in engagement with the work. During the normal operation, by the time the saw has reached the end of its retracted or non-cutting stroke, the cam 50 will have passed off the end of the lever 48 and the coil spring 32 will come into play to force the pawls 30 downwardly, thereby rotating the shaft 26 in an opposite direction to feed the saw into the work. At the same time the dash pot comes into play to cushion the action of the spring 32.

I claim as my invention:

1. In a power hack saw, in combination, means for reciprocating the saw horizontally and means for feeding the saw to the work, including a ratchet connected to the saw, a pawl cooperating with the ratchet for urging the saw to the work, pressure means actuating said pawl, a dash pot for cushioning the action of said pressure means and means for retracting said pawl during the non-cutting stroke of the saw.

2. In a power hack saw, in combination, means for reciprocating the saw horizontally and means for feeding the saw to the work, including a shaft, a gear driven by said shaft, a rack connected to the saw and operated by said gear, a ratchet wheel mounted on said shaft, a pawl bar cooperating with said ratchet wheel, a spring urging said pawl bar in a saw-feeding direction, a cylinder, a piston connected to said rack and operating in said cylinder and means for retracting said pawl bar during the non-cutting stroke of the saw.

3. In a power hack saw, in combination, means for reciprocating the saw horizontally, a ratchet for moving said saw toward the work, a pawl for operating said ratchet in a saw-feeding direction, a second ratchet for raising said saw from the work, a pawl for operating the same and means for retracting said saw-feeding pawl and advancing said saw-raising pawl on the non-cutting stroke of the saw.

4. In a power hack saw, in combination, means for reciprocating said saw horizontally, means for feeding the saw to its work and means for raising the saw from the work during its non-cutting stroke, including a rack, a gear driving said rack, a ratchet connected to said gear for rotating the same in a direction to raise the saw from the work and a pawl for operating said ratchet and automatically driven in an operative direction at the end of the cutting stroke of the saw.

5. In a power hack saw, in combination, means for reciprocating the saw horizontally, a rack for raising and lowering said saw, a gear meshing with said rack, a ratchet wheel connected to said rack for rotating the same in one direction to raise the saw from the work, a second ratchet wheel connected with said gear for rotating the same in the opposite direction for feeding the saw to the work, a pair of pawl members adapted to respectively rotate said ratchets in opposite directions, and means for automatically projecting and retracting said pawl members.

In witness whereof I, EVERETT GREEN, have hereunto set my hand at Indianapolis, Indiana, this ——— day of ———, A. D. one thousand nine hundred and twenty-three.

EVERETT GREEN.